UNITED STATES PATENT OFFICE.

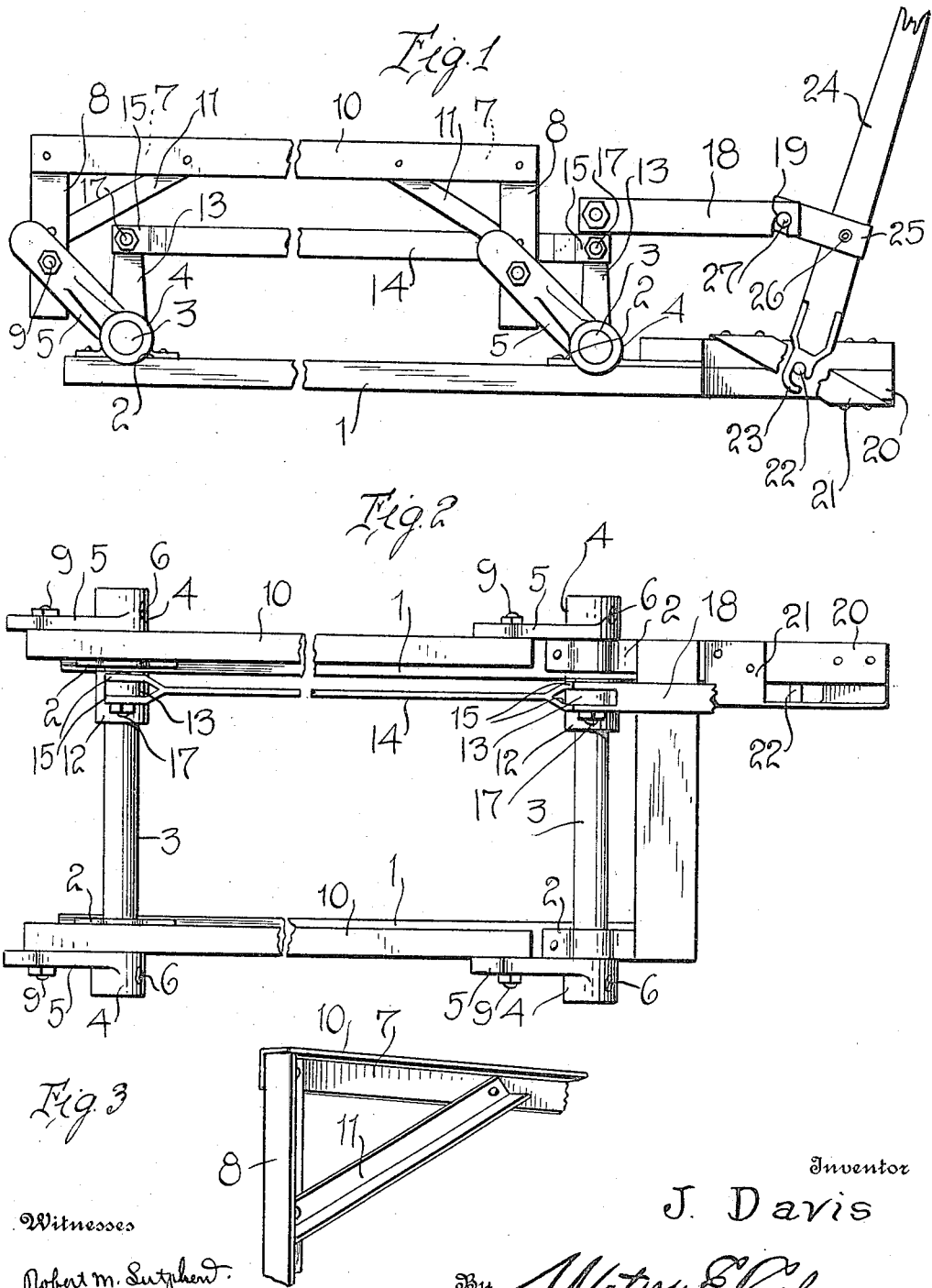

JETHRO DAVIS, OF RARITAN, ILLINOIS.

AUTOMOBILE-JACK.

1,165,762.  Specification of Letters Patent.  Patented Dec. 28, 1915.

Application filed January 23, 1915. Serial No. 4,023.

*To all whom it may concern:*

Be it known that I, JETHRO DAVIS, a citizen of the United States, residing at Raritan, in the county of Henderson and State of Illinois, have invented certain new and useful Improvements in Automobile-Jacks, of which the following is a specification, reference being had to the accompanying drawings.

This invention relates to new and useful improvements in jacks and more particularly to an automobile jack, the main object of the present invention being the provision of an automobile jack adapted to be installed in a garage for raising an automobile should it be desired to repair the tire or the device can be used for supporting the machine off the ground when it is desired to let the machine stand a considerable length of time so that the weight of the machine will be removed from the tires.

Another object of the present invention is the provision of an automobile jack wherein an automobile may be readily driven over the jack and the jack readily operated to engage the axles, whereby to raise the machine entirely off the ground.

Another object of the present invention is the provision of an automobile jack of the above character which will possess advantages in points of efficiency and durability, is inexpensive to manufacture and, at the same time, is simple in construction and operation.

With the above and other objects in view, the invention consists in the novel features of construction, combination and arrangement of parts as will be hereinafter referred to and more particularly pointed out in the specification and claims.

In the accompanying drawing forming a part of this application, Figure 1 is a side elevation of an automobile jack constructed in accordance with my invention. Fig. 2 is a top plan view, the lever being omitted; and Fig. 3 is a detail perspective view of one corner of the frame, illustrating the manner of bracing the same.

In the construction of my improved automobile jack, I provide the spaced beams 1 which form the base of my improved jack. Secured to the upper face of these beams, adjacent each end thereof, are the bearings 2 and mounted for rotation within these bearings, are the shafts 3. Mounted upon the shafts 3 at each end thereof and arranged upon the outer sides of the beams 1, are the sleeves 4 having outwardly projecting arms 5. It will be understood that these sleeves 4 may be securely held in position in any desirable manner but it is preferred to have them retained in place by means of the set screws 6. The body of the jack consists of spaced frame members, each frame member including a longitudinal angular bar 7 and extending downwardly at right angles from each end of the bar, is a vertically disposed angular bar 8, the lower end of which is pivotally connected to the outer end of each of the arms 5 by means of the bolts 9. From the above it will be apparent that upon the rotation of the shafts 3, the arms 5 will be actuated to raise and lower the main frames of the jack.

The frames of the jack, which are generally indicated by the numeral 10, are braced by means of the angular bars 11, one end of each of said bars being rigidly secured to the longitudinal bar 7, while the other end thereof extends downwardly and is secured to one side of the vertical bars 8. From this it will be apparent that I have provided a simple and durable frame member which will support an automobile in spaced relation with the floor. In order to provide means for rotating the shafts 3, suitable sleeves 12 are mounted upon the shafts between the spaced beams 1 and formed integral with these sleeves, are the outwardly projecting arms 13 which are connected by means of a longitudinal bar 14, the ends of which are bifurcated to form spaced flanges 15 adapted to be arranged upon opposite sides of the ends of the arms 13 and pivotally connected by means of the pins 17. It will be noted that one of the arms 13 is somewhat longer than the other arm and loosely connected to the extreme outer end of this longer arm is a bar 18 having bifurcated ends and the outer end of said bar being provided with curved recesses forming hooks 19, the purpose of which will be hereinafter more fully set forth.

One end of one of the base beams 1, extends outwardly beyond the opposite base beam, as shown at 20 and carried thereby, is a bracket 21 and mounted within this bracket and the base beam is a pivot pin 22 adapted to be engaged by a hook 23 carried by the inner end of the operating lever 24. This operating lever is provided with a U-shaped member 25, the intermediate portion of which embraces the lever and is secured as shown at 26, while the ends thereof project outwardly beyond one side of the lever and are provided with perforations to receive a pin 27 which is adapted for engagement with the hook portions formed by the recesses 19 so that upon reciprocation of the lever 24, the shafts 3 will be rotated to raise and lower the frames 10.

From the above description taken in connection with the accompanying drawings, it will be apparent that I have provided a simple and durable automobile jack which can be installed within large garages or private garages and when it is desired to raise and lower the frames 10, the lever 24 is actuated to reciprocate the bar 14 and rotate the shafts 3, which in turn will actuate the arms 5 to raise the frames 10 to a substantially horizontal position. It will be noted that when the arms 5 are in a vertical position, they will support an automobile in spaced relation from the ground. It will be noted that the lever 24 is detachably connected to the device so that it is only necessary to have one lever for operating a number of jacks.

My improved automobile jack, as herein shown and described is extremely simple and can be manufactured and placed upon the market at a comparatively low cost.

While I have shown and described the preferred form of my invention, it will be obvious that various changes in the details of construction and in the proportions may be resorted to for successfully carrying my invention into practice, without sacrificing any of the novel features or departing from the scope of the invention, as defined by the appended claims.

Having thus described this invention, what I desire to claim and secure by Letters Patent, is:—

1. An automobile jack including a base, shafts rotatably mounted thereon, arms carried by the shafts, frame members pivotally connected to the arms, a second set of arms carried by the shafts, a longitudinal bar connecting said second arms, a second bar having one end connected to one of the second arms, hook portions formed at the other end thereof, a lever having removable connection with the base, and means for connecting the lever with the hook portions of the second bar, whereby to actuate the connecting bar to rotate the shafts and raise and lower the frames.

2. A jack including a pair of rotatable shafts, a pair of supporting arms carried by each of said shafts, a pair of rigid substantially U-shaped frames having their arms pivotally connected to the supporting arms of the shafts, and means operable for rotating the shafts, whereby the horizontally disposed bight portions of the U frames may be lifted or lowered.

In testimony whereof I hereunto affix my signature in the presence of two witnesses.

JETHRO DAVIS.

Witnesses:
 CHARLIE CANN,
 JAS. K. BARRY.